(12) United States Patent
Naccache et al.

(10) Patent No.: US 7,168,065 B1
(45) Date of Patent: Jan. 23, 2007

(54) METHOD FOR MONITORING PROGRAM FLOW TO VERIFY EXECUTION OF PROPER INSTRUCTIONS BY A PROCESSOR

(75) Inventors: David Naccache, Paris (FR); Ludovic Rousseau, Aubagne (FR); Pierre Girard, La Ciotat (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 09/936,174

(22) PCT Filed: Jan. 24, 2000

(86) PCT No.: PCT/FR00/00150

§ 371 (c)(1),
(2), (4) Date: Dec. 6, 2001

(87) PCT Pub. No.: WO00/54155

PCT Pub. Date: Sep. 14, 2000

(30) Foreign Application Priority Data

Mar. 9, 1999 (FR) .................................. 99 02924

(51) Int. Cl.
*G06F 9/44* (2006.01)
(52) U.S. Cl. ........................ 717/127; 717/124; 712/229
(58) Field of Classification Search ................ 717/127, 717/124; 713/200, 201; 712/229; 711/125
See application file for complete search history.

(56) References Cited

U.S. PATENT DOCUMENTS

| | | | | |
|---|---|---|---|---|
| 4,266,272 A | | 5/1981 | Berglund et al. | |
| 5,347,581 A | * | 9/1994 | Naccache et al. | 380/30 |
| 5,452,357 A | * | 9/1995 | Naccache | 713/172 |
| 5,933,498 A | * | 8/1999 | Schneck et al. | 705/54 |
| 5,974,549 A | * | 10/1999 | Golan | 713/200 |
| 5,983,348 A | * | 11/1999 | Ji | 713/200 |
| 5,991,414 A | * | 11/1999 | Garay et al. | 713/165 |
| 6,014,723 A | * | 1/2000 | Tremblay et al. | 711/1 |
| 6,021,469 A | * | 2/2000 | Tremblay et al. | 711/125 |
| 6,023,764 A | * | 2/2000 | Curtis | 713/200 |

(Continued)

FOREIGN PATENT DOCUMENTS

EP 0012794 A 7/1980

OTHER PUBLICATIONS

"Batch Exponentiation A Fast DLP-based Signature Generation Strategy", David M'Raithi and David Naccache, ACM, 1996, pp. 58-61.*

(Continued)

*Primary Examiner*—Todd Ingberg
(74) *Attorney, Agent, or Firm*—Buchanan Ingersoll & Rooney, PC (57) ABSTRACT

In a method for monitoring the flow of execution of a series of instructions of a computer program, a sequence of instructions are transmitted to the processor to execute the monitored program. These instructions are analyzed, and the result of the analysis are verified by referring to reference data recorded with the program. The reference data can include a value predetermined in such a way as to correspond to the result of the analysis produced during the monitoring process only if all the instructions have been actually analyzed during the program flow. The invention also concerns a device for monitoring the program execution, a program device, and a programming device operating according to the monitoring principles.

36 Claims, 5 Drawing Sheets

U.S. PATENT DOCUMENTS

| | | | | |
|---|---|---|---|---|
| 6,065,108 | A * | 5/2000 | Tremblay et al. | 712/201 |
| 6,092,120 | A * | 7/2000 | Swaminathan et al. | 709/247 |
| 6,199,181 | B1 * | 3/2001 | Rechef et al. | 714/38 |
| 6,275,938 | B1 * | 8/2001 | Bond et al. | 713/200 |
| 6,279,123 | B1 * | 8/2001 | Mulrooney | 714/35 |
| 6,314,409 | B1 * | 11/2001 | Schneck et al. | 705/54 |
| 6,327,700 | B1 * | 12/2001 | Chen et al. | 717/127 |
| 6,402,028 | B1 * | 6/2002 | Graham et al. | 235/380 |
| 6,418,420 | B1 * | 7/2002 | DiGiorgio et al. | 705/40 |
| 6,507,904 | B1 * | 1/2003 | Ellison et al. | 712/229 |
| 6,510,352 | B1 * | 1/2003 | Badavas et al. | 700/19 |
| 6,546,546 | B1 * | 4/2003 | Van Doorn | 717/114 |
| 6,557,168 | B1 * | 4/2003 | Czajkowski | 717/151 |
| 6,581,206 | B1 * | 6/2003 | Chen | 717/143 |
| 6,615,264 | B1 * | 9/2003 | Stoltz et al. | 709/227 |
| 6,668,325 | B1 * | 12/2003 | Collberg et al. | 713/194 |
| 6,698,662 | B1 * | 3/2004 | Feyt et al. | 235/492 |
| 6,802,054 | B1 * | 10/2004 | Faraj | 717/128 |
| 6,859,533 | B1 * | 2/2005 | Wang et al. | 380/28 |
| 6,862,684 | B1 * | 3/2005 | DiGiorgio | 713/163 |
| 6,941,285 | B1 * | 9/2005 | Sarcanin | 705/67 |
| 6,951,018 | B1 * | 9/2005 | Long et al. | 718/100 |
| 2002/0174309 | A1 * | 11/2002 | Naccache et al. | 711/163 |
| 2003/0079127 | A1 * | 4/2003 | Bidan et al. | 713/172 |
| 2003/0188170 | A1 * | 10/2003 | Bidan et al. | 713/182 |
| 2004/0088555 | A1 * | 5/2004 | Girard et al. | 713/192 |

OTHER PUBLICATIONS

JAVA 2 Complete, SYBEX, Steven Holzner, pp. 3-28, 1999.*

"A New Public Key Crytosystem Based on Higher Residues", David Naccache et al, ACM 1998, pp. 59-66.*

"Twin Signatures:An Alternative to the Hash-and-Sign Paradigm", David Naccache et al, ACM 2001, pp. 20-27.*

"PicoDBMS:Scaling Down Database Technique For The Smartcard", Philippe Pucheral et al, VLDL Journal, 2001, pp. 120-132.*

"Implementation for Coalesced Hashing", Jeffrey Scott Vitter Brown University, ACM, Dec. 1982, pp. 911-926.*

"Optimal Arrangement of Keys in Hash Table", Ronald L. Rivest, ACM, Apr. 1978, pp. 200-209.*

"Code Optimization Techniques for Embedded DSP Microprocessors", Stan Liao et al, ACM, 1995, 6 pages.*

"Fundemental Technique for Order Optimization", David Simmen et al, ACM, 1996, pp. 57-67.*

Java Card API 2.0 Specification Finalized, Oct. 15, 1997, Press Release, 2 pages.*

Understanding Java Card 2.0 Zhinquin Chen et al, JAVAWorld, Mar. 1998, 12 pages.*

Java Card 2.0 Programming Concepts, Sun Microsystems Inc. Oct. 15, 1997, 25 pages.*

Java Card 2.0 Language Subset and Virtual Machine Specification, Oct. 13, 1997, Sun Microsystems Inc, 14 pages.*

Java Card 2.0 Application Programming Interfaces, Oct. 13, 1997, Sun Microsystems Inc, 163 pages.*

The K Virtual Machine (KVM), Sun MicroSystems Inc, Jun. 8, 1999, Whole Manual.*

Java Card Applet Developer's Gudie, Sun MicroSystem Inc, Aug. 19, 1998, Whole Manual.*

* cited by examiner

METHOD FOR MONITORING PROGRAM FLOW TO VERIFY EXECUTION OF PROPER INSTRUCTIONS BY A PROCESSOR

This disclosure is based upon, and claims priority from, French Application No. 99/02924 filed Mar. 9, 1999 and International Application No. PCT/FR00/00150, which was published in a language other than English on Sep. 14, 2000, the contents of each of which are incorporated herein by reference.

BACKGROUND OF THE INVENTION

The present invention relates to the field of computer program security, and more particularly a method and device for detecting unacceptable steps in the execution of a computer program, the latter being able to be in a low-level or high-level language.

In a program in low-level language, the commands are formulated according to a structure very close to that of the instructions actually executed by the processor part of the computer. The program requires only to be compiled before being able to be executed. Low-level languages, known by the name of machine code, are used notably for programming microprocessors or microcontrollers. Microcontrollers are processors which can execute only a small number of specific instructions. They are used notably for equipping smart cards (bank cards, telephone cards, cards providing access to services, etc) and for controlling industrial or domestic equipment.

In a program in high-level language, the commands have a structure closer to natural language, but on the other hand further away from that used by the processor. The commands written in such languages must first of all be interpreted, that is to say converted into machine code commands, before then being able to be put in the form of instructions with a view to their execution by the processor.

Thus any computer program gives rise to a series of instructions adapted to the processor, microprocessor or microcontroller for which it is intended.

Conventionally, the instructions of a program are executed by a processor in a sequence governed by an instruction counter, as will be described briefly with reference to FIG. 1.

The compiled instructions of a program are loaded in blocks of successive instructions Inst.1, Inst.2, Inst.3, . . . , Inst.n (where n is an integer) in the form of codes or microcodes in an instruction register 2. Each instruction is identified by a specific address in this register 2. In the example, the addresses of the instructions Inst.1, Inst.2, Inst.3, . . . , Inst.n are designated respectively Ad.1, Ad.2, Ad.3, . . . , Ad.n. The instructions are read from the instruction register 2 and loaded successively into the processor 4 in order to be executed therein under the control of an instruction counter 6, itself controlled by the processor 4. For this purpose, the instruction counter 6 has an address pointer 8 which designates the address Ad.1, . . . Ad.n of the register 2 from which the instruction to be loaded into the processor 4 during the execution of an instruction sequence must be read. The position of the pointer 8 vis-à-vis addresses in the instruction register 2 therefore changes along with the execution of the instructions.

Figure 1:
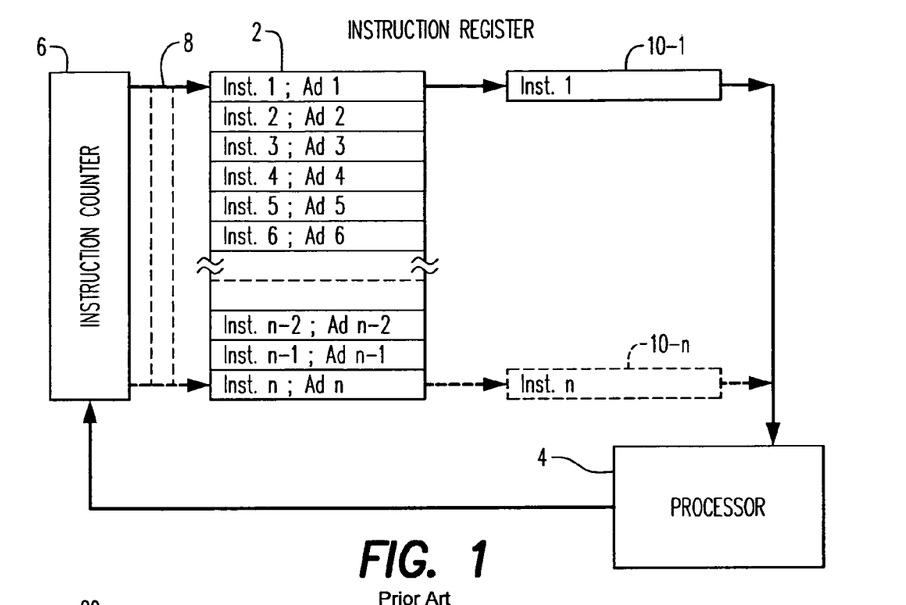
FIG. 1, already presented, is a simplified block diagram aimed at explaining the role of an instruction counter in the execution of a program.

In the example depicted in FIG. 1, the instructions Inst.1, Inst.2, Inst.3, . . . , Inst.n in the register 2 must be executed successively from the first instruction Inst.1 to the $n^{th}$ instruction Inst.n, that is to say in a linear fashion. Thus the pointer 8 of the instruction counter 6 designates initially the address Ad.1 of the register 2, and the data 10-1 of the corresponding instruction Inst.1 are loaded into the processor 4. When the processor 4 orders the instruction counter 6 to supply the next instruction (in this case Inst.2), the said counter increments the position of the pointer 8 by one address change unit in order to designate the address Ad.2. This process is repeated and terminates when the pointer 8 designates the address Ad.n in order to load the data 10-$n$ of the last instruction Inst.n (dotted lines).

A series of instructions executed in a linear fashion does not contain any "jumps" which escape from the sequential progression of the pointer 8 vis-à-vis successive addresses. This is the case, for example, with a sequence of instructions in microcodes such as:

| | |
|---|---|
| lda | t |
| txa | |
| mul | |
| bset | 3,t |
| sta | n |

In other words, this sequence will be executed in a linear fashion, the instruction counter 6 being incremented by one address change unit when passing from one instruction to another.

However, it is normal for the execution of a program to require jumps to instructions outside the linear sequence of the instructions as presented in the register 2. Such jumps can result from an instruction for loading data situated in an address outside the sequence, or from an instruction, referred to as a switching instruction, for conditional execution of the following command.

An instruction which causes a jump makes it necessary, at the instruction counter 6, to determine the address in the register 2 of the next instruction following this jump and to position the pointer 8 at this address so that the instruction or the data situated there is loaded into the processor 2.

By way of example, the sequence:

| | | |
|---|---|---|
| lda | | |
| txa | | |
| bra | label | ;jump |
| mul | | |
| bset | 3,t | |
| sta | n | |
| label | rts | | will cause the loading of a new value into the instruction counter 6 at the position in the code corresponding to the comment "jump".

The fact of thus being able to make, under command, jumps to addresses outside a sequential series of addresses may unfortunately give rise to unacceptable steps in the program. Such unacceptable steps in the program may result from an accidental malfunctioning of the program device. However, it may also result from a malevolent action aimed at diverting the functioning of the program device from its required function. For example, in the case of a smart card, modifications to the programming of the microprocessor by creating or modifying jumps and/or switches may make it possible to load erroneous data (increasing credit authorised with a bank or telephone card, false authorisation of access to certain services, etc) or to recover confidential data stored in memory (access code, personal information concerning the holder of the card, etc).

This is because, even when the programs are recorded in a fixed manner on a semiconductor chip, it is possible, with current techniques for probing and testing components, to create probing contacts on the surface of the chip (or even in the low layers thereof) using work stations with focus ion beams or FIBs.

Once created, these probing points make it possible to deposit probing spikes using specialised workbenches, also known by the English term "probe stations", allowing the continuous reading of a bit (and the monitoring of its change over time) or an external modification of its value.

In particular, depositing contacts on the register of the instruction counter 6 makes it possible to externally load the value of the register currently being executed and to cause a switching not provided for by the program designer. As explained above, such a jump may naturally have harmful consequences for the security of the application and, for example, result in the disclosure of secret data whilst effecting incomplete calculations.

There also exist more rudimentary, but less certain, ways of causing such malfunctioning in the running of the program. One example is given in an article entitled "Tamper resistance, a cautionary note" by R. Anderson. Another technique consists of exploiting calculation errors deliberately caused in order to extract, from a smart card, data such as the secret keys. This technique is described in the article entitled "On the Importance of Checking Computations" by Boneh, DeMillo and Lipton; Bellcore Report, published on 31 Oct. 1996.

Naturally, the same phenomenon can also occur when the program attacked is interpreted instead of being compiled. Thus an application in Java or Basic language can be diverted from its legitimate use if the attacker manages, for example, to cause a change in the program pointer of the interpreter indicating the current instruction to the interpreter.

However, current computer systems are not specifically designed to prevent uncontrolled switchings within a code. Quite the contrary, the assembly languages have been specifically designed to allow the maximum freedom to the programmer. By way of example, in C language, it is possible to jump within the code of a function using the execution indexed by the pointer.

SUMMARY OF THE INVENTION

In the light of these problems of running a program in an unacceptable manner, whether they are caused by unwanted malfunctioning or an intention to divert the program from its expected use, the invention proposes a method for monitoring the progress in execution of a series of instructions of a computer program, consisting of analysing the sequence of instructions transmitted to the processor intended to execute the program being monitored and to verify the result of this analysis with reference data recorded with the said program.

Thus the present invention makes it possible to verify that all the instructions included in the set of instructions under consideration have indeed been transmitted to the processor with a view to their execution. It is to be assumed that, if such is the case, the instructions read thus will also have been executed.

The reference data can for example be a value pre-established so as to correspond to the result of the analysis effected during the monitoring method only if all the instructions in the sequence of instructions have actually been analysed during the running of the program.

Preferably, the analysis step comprises the substeps of extracting a data item from each instruction transmitted to the processor and of predetermined calculation on each data item thus extracted, and the verification step includes the comparison of the result of the analysis with the reference data.

Advantageously, the verification step is effected by a hard-wired comparison of a value contained in a register associated with the monitoring means with the reference value, the latter being able to be entered in the program in a hard-wired manner, fixed (for example in a fixed memory of the ROM type) once and for all during the masking of the code which constitutes the program being monitored.

Preferably, the verification is caused by an instruction placed at a predetermined location in the program, this instruction containing the aforementioned reference data.

Advantageously, when the instructions in the set of instructions to be monitored are in the form of a value, hexadecimal or decimal, these instructions are treated as simple numerical values during the aforementioned analysis.

The global method for monitoring the execution of a sequence of instructions of a computer program can thus comprise the following steps:

during the preparation of the program:

incorporating, at at least one predetermined location in a sequence of instructions in the program, a reference value established according to a given rule applied to identifiable data in each instruction to be monitored, and during the execution of the part of the program to be monitored:

obtaining the said identifiable data in each instruction executed, applying the said given rule to the said identifiable data thus obtained in order to establish a verification value, and verifying that this verification value actually corresponds to the reference value recorded with the program.

In a preferred embodiment of the invention, provision is made for interrupting the running of the program when it is detected that the verification value does not correspond to the reference value. This interruption can be accompanied by an invalidation action for future use of the device comprising the computer program monitored if the non-correspondence between the verification value and the reference value is detected a predetermined number of times.

Advantageously, the set of instructions to be monitored does not include jumps in its running provided for, so that it is expected for all the instructions which it includes to be executed in all cases envisaged.

When the program or portion of program to be monitored provides for at least one jump, it is possible to apply the monitoring method separately to the sets of instructions which do not include jumps.

In the case of an instruction giving rise to at least one jump dependent on the data being manipulated, that is to say a conditional switching, it is possible to use the monitoring method separately for a set of instructions with no jumps and which precedes the jump, and for at least one set of instructions with no jumps which follow this jump.

In this case, it can be envisaged that, for a set of instructions preceding a jump, there is integrated in this set the instruction which demands the jump (this instruction normally being the last one before a switch) for the purpose of the analysis aimed at obtaining the verification value of this set of instructions, and the correct running of this set of instructions is thus verified before executing the jump instruction.

Advantageously, the verification value obtained during a previous implementation of the method is erased at each new implementation of the method. This provision makes it possible to easily manage the monitoring of different sets of instructions in a program, such as those separated by jumps. It makes it possible notably to implement the method with the same initial conditions of verification value calculation for the different sets separated by jumps.

At each new implementation of the method, the verification value can be erased by a simple resetting. This value can also be replaced by another predetermined initial value. These resetting or initialisation operations can be activated by the protected software itself.

Advantageously, the verification value is obtained as the last value of a series of values which are made to change successively with the analysis of each of the relevant instructions of the set of instructions. This approach makes it possible to contain an internal state of the running of the monitoring method and to follow its changes.

Preferably, the analysis mode allowing this change in the verification value consists of calculating, for each relevant instruction following on from a previous instruction, the result of an operation on both a value extracted from the instruction in question and the result obtained by the same operation performed on this previous instruction. For the calculation related to a first instruction to be verified, it is possible to apply an operation to both the data extracted from this first instruction and a predetermined value (which may then correspond to the reinitialisation value or the aforementioned resetting value), this being able to serve as a "seed" value in the absence of a result of a previous operation.

In this way, it is possible to obtain the correct verification value using a recursive algorithm applicable in the same way for the data extracted from each of the instructions in question. What is more, the calculation operation can easily be chosen so that a correct verification value is obtained only if some of the data of all the instructions have been considered during the calculation, and moreover they have been considered in the order provided for.

The calculation operation can consist in applying a hash function, according to a technique known per se in the field of data enciphering, such as the SHA-1 hash function established by federal hash standard. In this case it is possible to effect the aforementioned internal change in the running of the monitoring method by cryptographically hashing all the operating codes (considered as numerical values) and the addresses executed since the last initialisation carried out.

In a variant, it is possible to change the verification value by making a redundancy calculation, not necessarily cryptographic, on all the operating codes and addresses executed since the last initialisation made. By way of example, it is possible to use algorithms of the CRC (cyclic redundancy check in English) type.

It is possible with the invention to obtain the comparison value by the calculation of intermediate values as the data included in the respective instructions are obtained during the execution thereof. With this approach, it is not necessary to save each value extracted from the instructions of the set of instructions in question. This is because, at the end of a calculation of intermediate value, only this intermediate value counts for calculating the next intermediate value (or the last value, which corresponds to the verification value), and the data item which made it possible to generate it is no longer to be taken into consideration. This arrangement makes it possible to save on memory space with regard to the means of implementing the invention.

As a variant, it is possible to save each data item included in the instructions of the set of instructions considered as they are executed and to effect the calculation of the verification value only at the necessary time, for example at the verification step.

The invention also relates to a device for monitoring the steps of execution of a series of instructions of a computer program, characterised in that it has means for analysing the sequence of instructions transmitted to the processor intended to execute the program monitored and means for verifying the result of this analysis with reference data recorded with the said program.

The monitoring device according to the present invention advantageously includes a register for recording intermediate results in the calculation of the verification value. This register can be adapted to retain only the last current intermediate result.

Provision can be made for allowing the recording of a predetermined value or a resetting under the command of the program currently being executed. In this way, the program can demand an initial condition with regard to the content of the register at each new implementation of the monitoring method, this acting for example after a jump in the program.

The monitoring device can be integrated into a device for executing a program to be monitored or into a programmed device which contains the program to be monitored.

The invention also relates to a program execution device, for example a computer, an appliance with a microprocessor or microcontroller such as a smart card reader or a reader for a program recorded on a card to the PCMCIA format, intended to execute a series of instructions of a computer program, characterised in that it has means for analysing the sequence of instructions transmitted for execution and means for verifying that the result of this analysis corresponds with reference data recorded with the program.

The invention also relates to a program device intended to function with the aforementioned program execution device and including a series of instructions, characterised in that it also includes reference data pre-established according to data contained in the said instructions and intended to allow a verification of the sequence of instructions analysed by the aforementioned program execution device.

The programmed device, for example a smart card or a mechanism control device, such as an ABS braking system, can include the program to be monitored in a fixed memory of the ROM type.

The reference data are advantageously recorded in the form of prewired values fixed in the memory once and for all during the masking of the code.

The present invention also relates to a device for programming a device for executing a program intended to function in association with the aforementioned programmed device, characterised in that it comprises means for entering, at at least one predetermined location in a series of instructions of the program, a reference value calculated according to a pre-established mode from data included in each instruction in a set of instructions whose execution it is wished to monitor.

Finally, the invention also relates to a virtual machine or interpreter interpreting a critical code, characterised in that it implements the aforementioned monitoring method for executing this critical code.

The aforementioned devices for monitoring, executing a program or programming or the devices equipped with such programs can be equipped with all the means necessary for achieving the different possible optional aspects of the aforementioned monitoring method.

By way of example, it is possible to envisage, in an application related to a smart card, to add to a microprocessor executing a program, an additional hardware component serving as a monitoring unit. The role of this unit is to monitor that any jumps not provided for by the software designer cannot take place during execution. In this example, the monitoring unit can be composed of registers whose content constitutes at any time the internal state of the monitoring unit. A specific input of the monitoring unit enables it to be reset, typically by erasing the content of the monitoring unit. This function can be activated at any time by the software being executed and can, for example, be effected by the addition of a new operating code in assembler (for example "clr us") or by manipulating a data bit in the memory of the protected component (for example: setb 3, service).

In this example application, the monitoring unit compares its internal state with a data string supplied by the protective software. This can for example be effected by copying, inside the monitoring unit (by means of a loop "lda-sta") the value at which the required software compares the internal state. Once the copying of the value has ended, the monitoring unit compares it with its internal state and adopts the following behaviour: if the state of the monitoring unit is equal to the value presented by the protected software, resuming the execution normally, otherwise the execution of the program is stopped (forcing the user to reset the card), possibly by previously ratifying a false execution counter in a non-volatile memory of the EEPROM type having the effect of definitive blocking of the card if its value exceeds a reasonable limit (for example 4).

The monitoring unit can permanently keep a cryptographic hash of the instruction code and addresses executed since its last resetting.

The monitoring mechanism can be adapted to the interpretation of code in a virtual machine (of the Java "byte code" type for example). The compiler can calculate the value of the hash of a portion of byte code, integrated into an attribute of a structure known by the English term product "class file" and add to the byte code generated codes known by the English term additional "opcodes" corresponding to the resetting of the monitoring unit and to the invocation of the verification function. The virtual machine will take the place of a monitoring unit and, when it encounters the verification opcode, will verify the value of the current hash with respect to the value of the theoretical hash contained in the class file.

BRIEF DESCRIPTION OF THE DRAWINGS

The invention will be more clearly understood and the advantages and characteristics will emerge more clearly from a reading of the following description of a preferred embodiment, given purely by way of example, with reference to the accompanying drawings, in which.

DETAILED DESCRIPTION

The principle of the invention will be explained with reference to the block diagram of FIG. 2, in which the blocks having a role similar to those of FIG. 1 bear the same references and will not be described again for reasons of conciseness.

Figure 2:
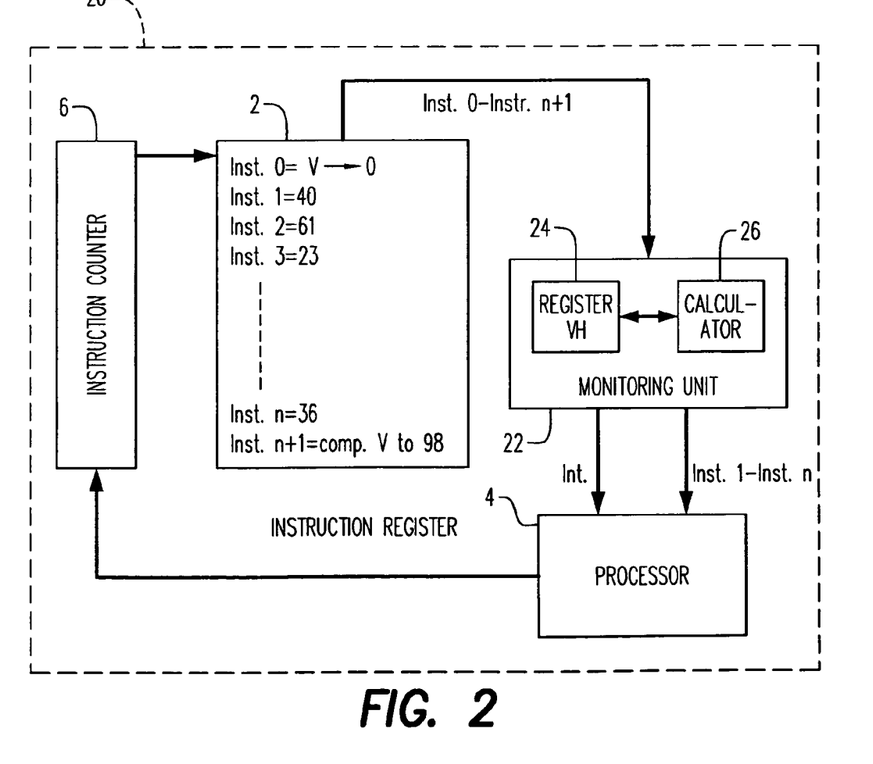
FIG. 2 is a simplified block diagram of a program execution device aimed at explaining the operating principle of a monitoring unit in accordance with a first embodiment of the invention.

FIG. 2 depicts the basic elements of a program execution device 20 in the broad sense of the word. It can be a computer intended to execute a program in a high-level language, a microprocessor or a microcontroller, the latter functioning from programs in low-level language. By way of example, the execution device 20 can be a smart card reader intended to manage banking or telephone transactions or other services. The program to be verified is then physically contained in the smart card.

In order to make the following description concrete, it will be assumed that the program execution device 20 is based on a processor 4 of the microcontroller type.

The processor 4 executes a portion of program stored in an instruction register 2 in the form of microcodes. The operational part of this program portion comprises a sequence of n instructions (where n is an integer greater than 1) designated respectively Inst.1, Inst.2, Inst.3, . . . , Inst.n. The microcodes which constitute the instructions are in the form of numerical values, which can be decimal or hexadecimal.

Such a value can thus be considered in two different ways, each carrying a data item: firstly as an instruction which it represents for the processor (in which case it will be designated "code value"), and secondly as a simple numerical value capable of arithmetic processing (in which case it will be designated "numerical value" Vinst.). For example, the first instruction Inst.1 is equal to 40. This figure is a code which corresponds to an instruction recognised by the processor, but it has the same binary structure as the numerical value 40.

None of the instructions Inst.1, Inst.2, Inst.3, . . . , Inst.n orders a jump to another instruction outside the linear sequence of execution of the instructions. Thus the normal and expected running of this program portion necessarily requires the execution of each of the instructions in succession, commencing with the instruction Inst.1 and ending with the instruction Inst.n. In this way, the instruction counter 6 (already described) will position its pointer 8 successively at the address of each of the instructions Inst.1 to Inst.n in the instruction register 2 as they have to be loaded into the processor 4.

In accordance with the present invention, the program execution device 20 has a monitoring unit 22 which makes it possible to verify that each of the instructions Inst.1 to Inst.n has indeed been loaded to the processor 4 with a view to their execution. It is functionally connected between the instruction register 2 and the processor 4. Thus all the instructions read from the instruction register 2 pass through the monitoring unit 2 before arriving at the processor 4.

In this example, the monitoring unit 22 is described as being integrated into the program execution device 20. However, the monitoring unit 22 can just as well be integrated with the device which includes the program to be monitored, whilst for example being incorporated in a smart card where the program which it contains in memory is to be monitored, without this changing the principles which will be described below.

As will be explained in more detail below, the monitoring unit 22 has a register 24 intended to temporarily store a data item included in the instruction Inst.1, Inst.2, Inst.3, . . . , Inst.n and a calculator 26 intended to execute an operation on this data item.

Use of the monitoring unit requires the addition of two new instructions to the n instructions Inst.1, Inst.2, Inst.3, . . . , Inst.n of the program. A first monitoring instruction Inst.0 placed before the first instruction Inst.1 of the program and a second monitoring instruction Inst.n+1 placed following the last instruction Inst.n of the program.

During the execution of the n instructions of the program, the instruction counter 6 is initially controlled so as to position its pointer 8 at the address of the first monitoring instruction Inst.0. This instruction instructs the monitoring unit to initialise a hash value VH contained in its register 24. In the example, the instruction Inst.0 simply instructs the register 2 to put the value VH=0. It is not transmitted to the processor 4.

Next, the program execution device 20 goes into the phase of executing the instructions Inst.1, Inst.2, Inst.3, . . . , Inst.n of the program proper. Each instruction read from the instruction register 2 is transmitted firstly to the monitoring unit 22, where it is considered as a numerical value.

The numerical value of each instruction is subjected by the calculator 26 to a hashing algorithm, such as SHA-1 hashing specified by the federal hashing standard. The result VHi of the hashing operation related to an instruction Inst.i (where i is an integer from 1 to n) is entered in the register 24.

This value VHi serves as a basis for the hashing operation with the following instruction Inst.i+1. The result of VHi+1 hashing thus obtained for the instruction Inst.i+1 is then entered instead of the hashing result VHi obtained previously.

This procedure is continued for each of the instructions Inst.1, Inst.2, Inst.3, . . . , Inst.n which pass through the monitoring unit 22.

When the last instruction Inst.n is executed, the second monitoring instruction Inst.n+1 is loaded into the monitoring unit 22. This instruction has two components: a reference value Vref and a command, intended for the calculator 26, for comparing this reference value Vref with the value of the last hashing result entered in the register 24. This last value therefore corresponds to the hashing result VHn obtained from the numerical value of the instruction Inst.n (equal to 36 in the figure) and the hashing result VHn−1 obtained for the previous instruction Inst.n−1.

Thus, in response to the second monitoring instruction Inst.n+1, the calculator 26 compares the value VHn in the register 22 with the reference value Vref specified in this monitoring instruction.

The reference value Vref is determined during the preparation of the program recorded in order to correspond to the expected value VHn for the result of the successive hashings of the values of the instructions Inst.1, Inst.2, Inst.3, . . . , Inst.n. This value Vref can be calculated in advance using the same procedure of successive hashing of the instructions Inst.1, Inst.2, Inst.3, . . . , Inst.n as used by the monitoring unit 22.

Preferably, the value Vref is wired in a fixed memory in order not to be able to be modified by a malevolent act.

If the monitoring unit 22 finds, whilst executing the monitoring instruction Inst.n+1, that there is identity between the aforementioned values Vref and VHn, it is concluded that all the instructions Inst.1, Inst.2, Inst.3, . . . , Inst.n have indeed been transmitted to the processor 4 with a view to their execution.

If, on the other hand, the monitoring unit 22 finds that there is not identity between the values Vref and VHn, it is concluded that either not all the instructions Inst.1, Inst.2, Inst.3, . . . , Inst.n have been received and transmitted by the monitoring unit, or they have not been received and transmitted in the expected sequential order. In this case, an action can be provided for aimed at alerting the user or owner of the program, or preventing the program from continuing. In the example, such an action is transmitted from the monitoring unit 22 to the processor 4 in the form of a command for interruption of the program Int.

The monitoring method as implemented by the means of FIG. 2 will now be described with reference to the flow diagram depicted in FIG. 3. It is assumed that the program or the program part to be monitored was prepared correctly for the monitoring method by the incorporation of the first and second monitoring instructions respectively at the start and end.

At the initial stage, the monitoring unit 22 is positioned on a start of monitoring routine 30, the first step 32 of which is the awaiting of the first monitoring instruction (Inst.0).

When the first monitoring instruction Inst.0 is received, the monitoring unit 22 effects a step 34 of initialisation (by resetting) of an instruction counter and the register 24. The resetting of the register 24 is a way of placing a "seed" value in this register in order to start a sequence of hashing operations, as will be explained later. These operations can be controlled directly by the first monitoring instruction or simply be triggered by it from a routine associated with the monitoring unit 22.

In this first case, the resetting can be effected by the addition of a new operating code in assembler (for example "clr us"), or by manipulating a given bit in the memory of the program execution device 20. Such a command can be "setb 3, service".

After the initialisation step, the monitoring unit 22 increments the instruction counter by one unit (then positioning this counter to n=1) (step 36).

Next, the first instruction Inst.1 of the program or the program part under surveillance is read from the instruction register 2 (step 38). As explained above, this instruction is considered by the monitoring unit 22 purely as a numerical value allowing arithmetic operations. In the example in FIG. 2, this value is 40.

The digital value of this first instruction Inst.1 is then subjected to a hashing operation with the value contained in the register 24 (step 40). In the case of the first instruction, this last value is the initialisation value, that is to say 0.

The hashing operation, well known per se, consists here of making a mathematical operator f(VHn−1, Vinst.n) act on the value of the instruction n in question, where VHn−1 is the result of a previous hashing operation (or the initialisation value in the case of the first instruction) recorded in the register 24 and Vinst.n is the numerical value of the instruction n in question.

The result VHn of this hashing operation is then recorded in the register 24 in place of the previous result VHn−1 (step 42). It should be noted that this procedure of updating the content of the register at each hashing operation makes it possible to permanently keep a cryptographic hash of the instruction codes and addresses executed since the last initialisation.

At the end of this hashing operation, the instruction is transmitted to the processor 4 with a view to its execution (step 44).

Next the monitoring unit 22 determines whether the program or the program part to be monitored contains another instruction to be executed (step 46).

This being the case, the procedure effects a looping back B1 to the step 36 of incrementation from n to n+1. The value of the next instruction (Inst.2) will then be read from the instruction register2 and subjected to the hashing operation in the same way as for the instruction Inst.1. However, the hashing takes place this time with on the one hand the numerical value of the instruction Inst.2 and the result obtained during the previous hashing operation, that is to say the value VH1 (n being here equal to 2), which is then in the register 24.

Steps 42 to 46 of the method take place in the same way as for the first instruction. In this way, the set of steps 36 to 46 continues in a loop for each instruction Inst.1, Inst.2, Inst.3, . . . , Inst.n read from the instruction register 2, with the hashing taking place, for an instruction Inst.i (where i is an integer from 1 to n) with the value VHni−1 in the register 24 and the value Vinst.i.

Once all the instructions Inst.1, Inst.2, Inst.3, . . . , Inst.n have been thus processed by the monitoring unit 22, the latter receives the second monitoring instruction Inst.n+1, this following the last instruction Inst.n of the program or of the program part being monitored.

This second monitoring instruction instructs the monitoring unit 22 to extract the reference value Vref from the program (step 48) and to compare the content of the register 24 with this value Vref (step 50). This command can be effected by means of a loop "lda-sta".

It should be stated that, by the execution of successive loops of steps 36 to 46, the value contained in the register 24 at this stage is the result VHn of the hashing carried out with the result VHn−1 of the previous hashing and the numerical value of the instruction n (equal to 36 in the example in FIG. 2).

The reference value Vref was previously determined during the preparation of the program with knowledge of the hashing operations, in order to be equal to what the monitoring unit 22 should return as the value VHn if all the instructions Inst.1, Inst.2, Inst.3, . . . , Inst.n were indeed transferred to the processor 4.

Thus the result of the comparison makes it possible to check that the instructions Inst.1, Inst.2, Inst.3, . . . , Inst.n have unfolded correctly: if VHn=Vref (step 52), it is assumed that all the instructions have actually been transferred to the processor 4. The monitoring operation is then terminated with regard to the program or program portion containing the instructions Inst.1, Inst.2, Inst.3, . . . , Inst.n.

The monitoring procedure then returns to the starting phase 30 awaiting a new first monitoring instruction.

If on the other hand the comparison step 50 reveals that there is no identity between the compared values (VHn≠Vref), it is assumed that not all the instructions Inst.1, Inst.2, Inst.3, . . . , Inst.n have been transferred to the processor 4, or have not been transferred in the correct order (step 54). This is because the result of a succession of hashing operations depends on the order in which they were carried out.

In this case, the monitoring unit 22 demands an action (step 56), such as the interruption of the program and/or of the recording of the fact that the program has not run correctly.

A variant of the aforementioned monitoring method will now be described with reference to the flow diagram in FIG. 4. According to this variant, instead of performing a hashing operation during the reception of each new instruction by the monitoring unit 22, all the hashing operations are performed only after reception of the second monitoring instruction. In the flow diagram in FIG. 4, the steps which are identical to those previously described with reference to FIG. 3 bear the same references and will not be described again for reasons of conciseness.

Figure 3:
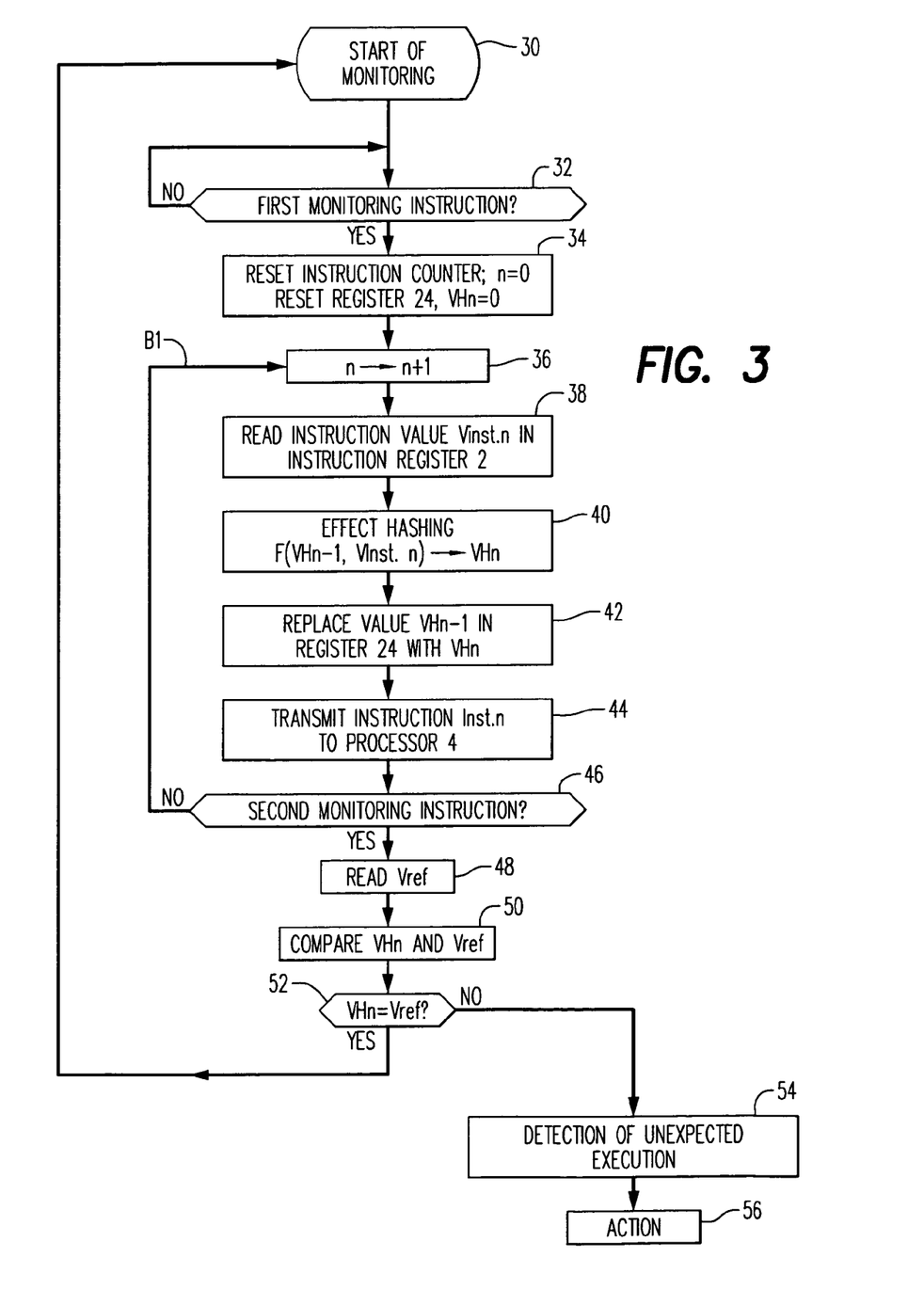
FIG. 3 is a flow diagram of the monitoring method according to the invention.
Figure 4:
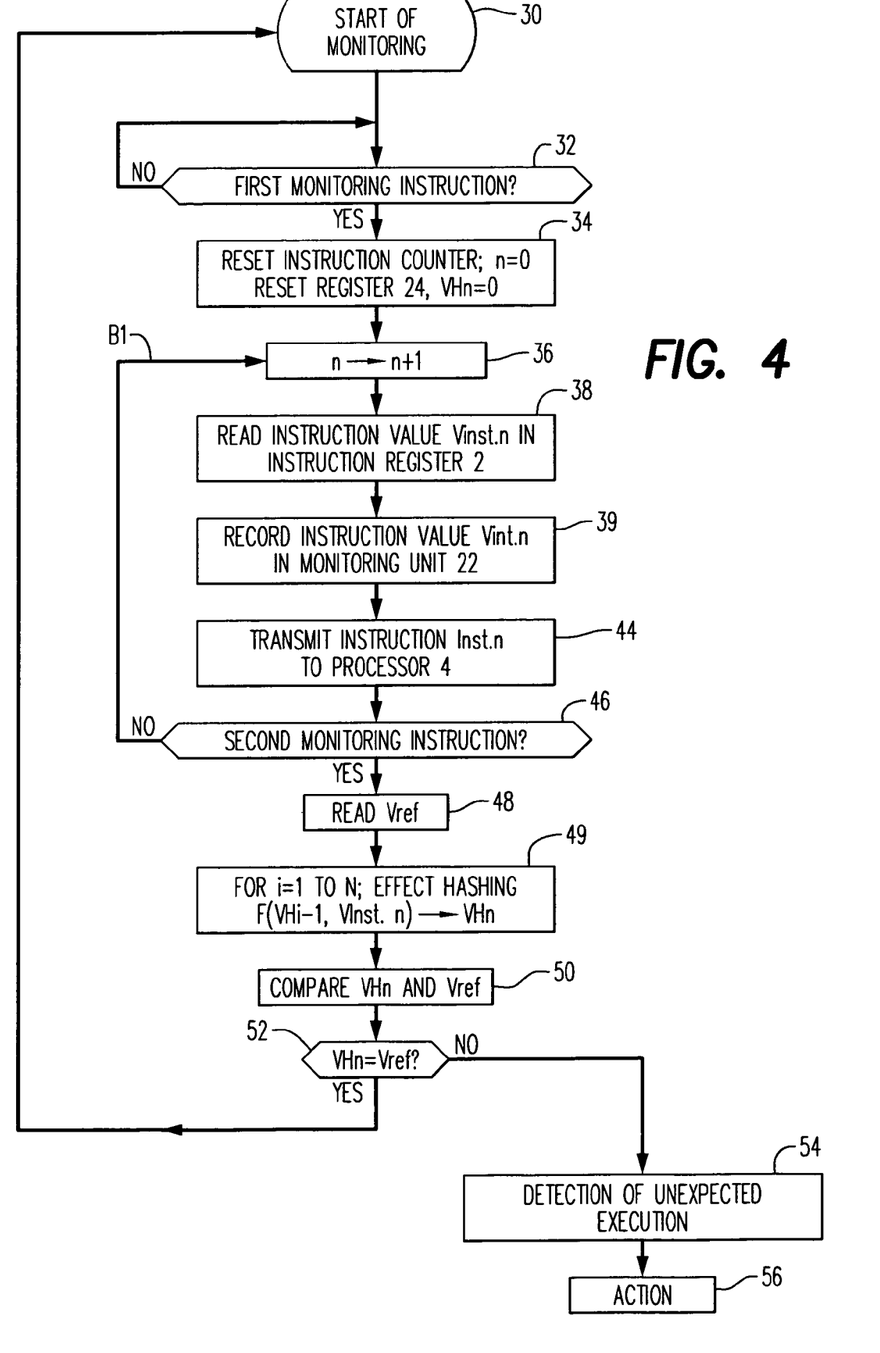
FIG. 4 is a flow diagram of a variant of the monitoring method according to the invention.

The monitoring method unfolds as for the previous case with regard to steps 30 to 38 (FIGS. 3 and 4). After the step 38 of reading the value of the instruction Vinst.n of the instruction register 2, the monitoring unit 22 proceeds with the recording of this value (step 39). This recording can take place in an internal register of the calculator 26, in a dedicated section of the register 24, in a specific memory (not shown) of the monitoring unit 22, or in a memory external to the monitoring unit 22, provided that it is accessible to the latter.

Next the monitoring unit 22 proceeds with the previously described steps 44 and 46. It will be noted that the step 39 of recording the values Vinst.n is in the loop B1 connecting step 46 to the step 36 of incrementing n by one unit, so that each of the values Vinst.n is thus recorded up to the detection of the second monitoring instruction at step 46.

When this second instruction appears, the monitoring unit 22 reads the reference value Vref (step 48) and performs at step 49 the hashing according to the same algorithm as at the previously described steps 40 and 42 of FIG. 3, based on the set of values Vinst previously recorded. The final hashing value VHn is then the same as in the case of the method in FIG. 3. It should be noted that it is possible to reverse the order of steps 48 and 49.

The comparison steps 50 and those which follow are identical to those in FIG. 3.

Figure 5:
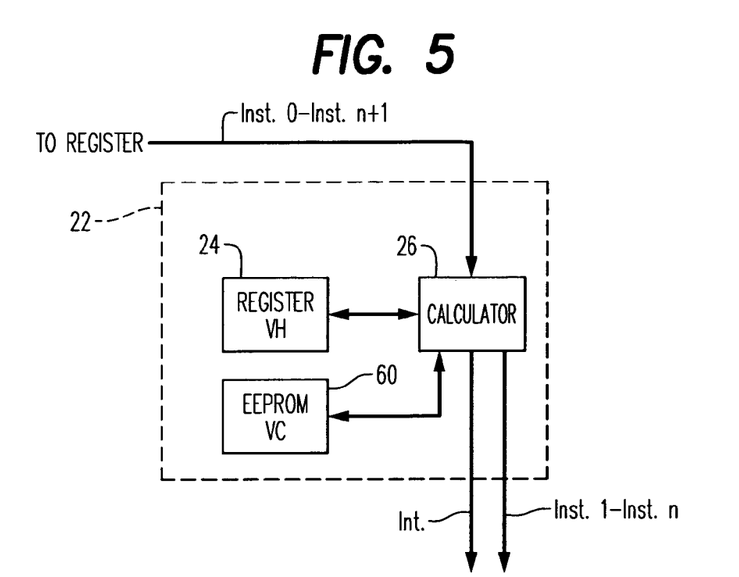
FIG. 5 is a simplified block diagram of a program execution device aimed at explaining the operating principle of a monitoring unit according to a second embodiment of the invention.

FIG. 5 is a simplified block diagram of the monitoring unit 22 in accordance with a second embodiment of the invention. Its integration into the program execution device 20 is the same as with the first embodiment described with reference to FIGS. 2 and 3 and with regard to its functioning with the instruction counter 6, the instruction register 2 and the processor 4, and will not be repeated for reasons of conciseness.

The monitoring unit 22 according to the second embodiment is distinguished from that of the first embodiment essentially by the fact that it also has a memory 60 which records the number of times the execution of a series of instructions Inst.1–Inst.n has not taken place correctly in accordance with the criteria explained with reference to FIG. 3 or 4.

In the example, the memory 60 is produced in the form of a fixed (non-volatile) memory with electrically erasable content (commonly known by the English term EEPROM).

The memory 60 is functionally connected to the calculator 26 so that it records a counting value VC incremented by one unit each time an incorrect execution is noted in the series of instructions being monitored. This counting value VC thus makes it possible to detect the number of incorrect performances of the series of instructions and to act accordingly, for example by invalidating any future use of the device containing the program (for example a smart card) if this number passes a threshold value.

Figure 6:
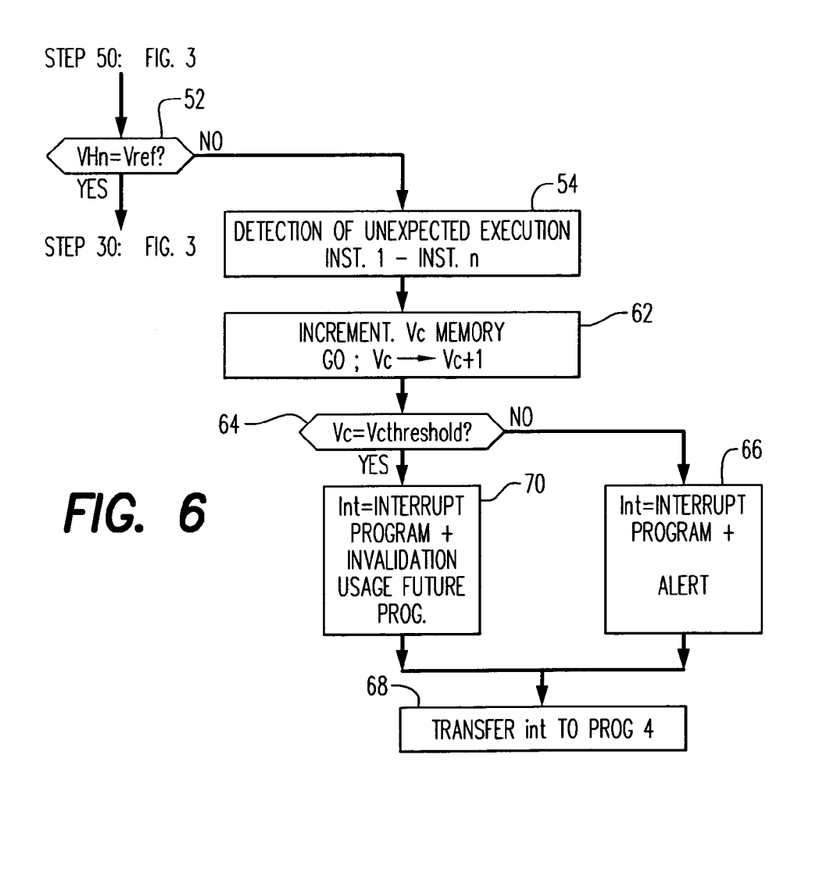
FIG. 6 is a flow diagram of the monitoring method according to the invention, adapted to the second embodiment, and FIG. 7 schematically depicts sets of instructions of a program with switching also containing instructions specific to the monitoring method.

The flow diagram in FIG. 6 gives an example of use of the counting value VC for monitoring the device of the execution of the program. This example includes the set of steps 30 to 54 of the flow diagram in FIG. 3 or the analogous steps in FIG. 4.

When the monitoring unit 22 detects at step 54 an unexpected execution of the instructions Inst.1–Inst.n, following the comparison step 52, the calculation unit 26 increments the counting value VC in the memory 60, initially 0, by one unit (step 62). Next it checks whether the counting value VC thus incremented has reached a predetermined threshold value VCthreshold (step 64). This threshold value VCthreshold corresponds to the number of times it is accepted that the unexpected execution of the instructions Inst.1–Inst.n can occur in the programmed device before taking definitive measures for dealing with such a fault. By way of example, in the context of a smart card, a moderate number of such failures can be accepted (for example 3 or 4) to the benefit of the doubt as to whether it could be a case of a momentary damage related to the reader (program execution device 20), but beyond this number it must be considered that the card has been impaired either accidentally or by malevolence. In this case of implementation, provision can also be made for entering the value VC in the programmed device (card) in order to keep a history of these faulty executions related physically to the program device.

If the counting value VC is below the threshold VCthreshold, the monitoring unit 22 establishes the interrupt command Int as previously described with a simple alert message intended for the user and/or the operating system (step 66) and transmits it to the processor 4 (step 68).

If on the other hand the counting value VC reaches the threshold value VCthreshold, the monitoring unit 22 then establishes the interrupt command Int as previously described with an instruction inhibiting any future use of the programmed device containing the instructions executed in an unexpected manner (step 70) and transmits it to the processor (step 68). In this case, it will be possible to reuse this device only after having reprogrammed the memory 60. Where this memory 60 is in the form of an EEPROM or other non-volatile memory, such a reprogramming is very difficult to perform in a diverted manner.

It will be noted that the program interrupt command Int accompanied by an alert message or future usage invalidation command transmission can be executed either at the processor, or at the monitoring unit 22.

It will now be described, with reference to FIG. 7, how the monitoring unit 22 according to the present invention can be used for the monitoring of a program which provides for jumps or switchings.

Figure 7:
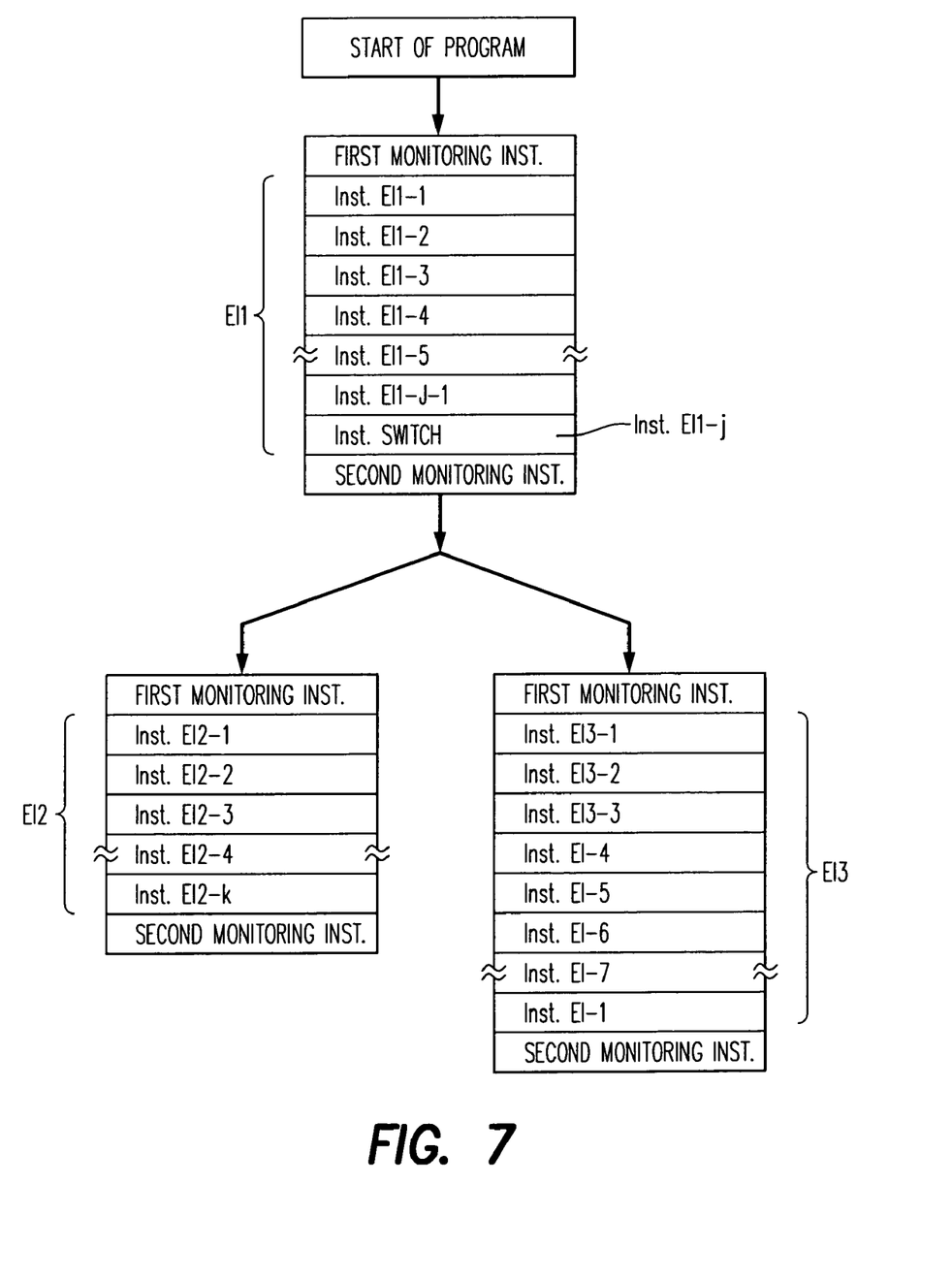

In the example in FIG. 7, the program execution device 20 contains in the instruction register 2 a program or program part intended for the processor 4, consisting of three sets of instructions:

a first set of instructions Inst.EI1-1 to Inst.EI1-*j* (where j is an integer>1), the last instruction EI1-*j* is a code which demands the conditional switching to one or other of the other two sets which follow;

a second set of instructions Inst.EI2-1 to Inst.EI2*k* (where k is an integer>1); the execution of the first instruction Inst.EI2-1 of this set follows on from the execution of the conditional switching instruction EI1-*j* if the first of two conditions posed by this is satisfied; and a third set of instructions Inst.EI3-1 to Inst.EI3*l* (where 1 is an integer>1); the execution of the first instruction Inst.EI3-1 of this set follows on from the execution of the conditional switching instruction EI1-*j* if the second of two conditions posed by this is satisfied.

The three sets of instructions EI1, EI2 and EI3 do not include any jumps within their sequence of instructions. (In the case of the first set of instructions, the conditional jump to the instruction EI1-*j* is at the end of the sequence.) Thus, for each of the three sets of instructions, all the instructions are designed to be executed sequentially as from the first.

During the preparation of the program, there are added at the head and tail of each set of instructions EI1, EI2 and EI3 respectively the first monitoring instruction and the second monitoring instruction described above with reference to FIGS. 2 to 6.

The monitoring of the program or of the program part composed of sets EI1, EI2 and EI3 then proceeds as follows.

The monitoring unit 22 is first of all positioned in the start of monitoring phase (step 30, FIG. 3).

The running begins with the execution of the first set of instructions EI1. The first monitoring instruction placed at the head of this set will first of all be loaded in the monitoring unit 22. In response to this instruction, the monitoring unit initialises its instruction counter and its hashing value VH register 24 (step 34, FIG. 3) and proceeds with the hashing routine for each instruction Inst.EI1-1 to Inst.EI1-*j* of the first set of instructions according to steps 36 to 46 of FIG. 3.

The last instruction EI1-*j* of the set which controls the switching is thus also subjected to hashing by the monitoring unit 22 in order to be transmitted to the processor 4.

The following instruction is the second monitoring instruction (step 46, FIG. 3) at the tail of the first set of instructions EI1, which brings about the phase of comparison between the last hashing value recorded in the register 24 with the reference value Vref associated with this second instruction.

If it is detected at the comparison step 50 (FIG. 3) that the last hashing value thus recorded does not correspond to the reference value Vref, the monitoring unit 22 proceeds with the program interruption steps 54 and 56 (FIGS. 3 and 4) or 54 to 70 (FIG. 6). Preferably, provision is made for this interruption to occur even before the program has executed the conditional switching. This can be achieved, for example, by associating the jump instruction with an await validation instruction coming from the monitoring unit, employing known programming techniques.

If it is detected at the comparison step 50 (FIG. 2) that the last hashing value thus recorded does actually correspond to the reference value Vref, the monitoring unit authorises the execution of the conditional switching determined by the last instruction EI1-*j* in the set. The program then continues to one or other of the second or third sets of instructions in accordance with the switching conditions posed by this last instruction.

It is assumed in the example that the conditional jump causes the switching to the second set of instructions to be executed. In this case, the instruction counter 6 makes the instruction pointer 8 pass directly from the second monitoring instruction at the tail of the first set of instructions EI1 to the first monitoring instruction at the head of the third set of instructions EI3.

The monitoring unit will execute this new first instruction by reinitialising the instruction counter and the register 24.

The monitoring procedure for this third set of instructions therefore continues exactly in the same way as with the first set of instructions. Thus the monitoring unit 22 will proceed with the successive hashing of each of the instructions read in this set, commencing the hashing with the same "seed" value (which corresponds here to zero) as for the first set. The second monitoring instruction this time makes it possible to detect an unexpected course of action in the execution located at this first set of instructions and to proceed with the same type of action at step 56.

It will be understood that the explanation given for the case of switching to the third set applies in a strictly similar manner in the case of a switching to the second set of instructions following the execution of the switching instruction and the first set of instructions.

It is possible to enable the monitoring unit 22 to count not only the number of unexpected steps in a program including jumps, but also the independently monitored sets of instructions in which they are produced.

Thus the monitoring unit 22 according to the second embodiment (FIG. 5) can record in its memory 60 the set of instructions to which each interruption noted relates. It is also possible to establish criteria for invalidation of future usage of the program according to the sets of instructions in which the interruptions are situated.

Naturally, it will be understood that the monitoring unit 22 can be either implemented separately from the processor 4 or integrated functionally in it.

Finally, it is clear that all the aspects of the invention described in terms of method can easily be understood in terms of physical means for their implementation, and vice-versa. Likewise, it will be understood that the invention described also covers all the obvious transpositions of one embodiment or its variant to another.

The invention claimed is:

1. A method for monitoring progress with the execution of a linear sequence of instructions in a computer program stored in a computer-readable memory, comprising the steps of analysing the sequence of instructions transmitted from said memory to a processor intended to execute the program being monitored by extracting a data item from each instruction transmitted to the processor and performing a calculation on said data item, and verifying the result of this analysis by comparing the result of said calculation to reference data, recorded with said program, wherein the reference data comprises a value pre-established so as to correspond to the result of the analysis produced during the monitoring method only if all the instructions in the sequence of instructions have actually been analysed during the running of the program.

2. A method according to claim 1, wherein the verification of the result of the analysis is caused by an instruction placed at a predetermined location in the program to be monitored, said instruction containing the reference data relating to a set of instructions whose correct execution is to be monitored.

3. A method according to claim 1 wherein, when the instructions of the set of instructions to be monitored are in the form of a value, said analysis of the instructions is carried out by using these instructions as a numerical value.

4. A method according to claim 1, comprising the steps of:
   during the preparation of the program to be monitored:
      incorporating, in at least one predetermined location in a sequence of instructions in the program, a reference value established according to a predetermined rule applied to identifiable data in each instruction to be monitored, and
   during the execution of the program to be monitored:
      obtaining said identifiable data in each instruction received for execution,
      applying said predetermined rule to said identifiable data thus obtained in order to establish a verification value, and
      verifying that this verification value actually corresponds to the reference value recorded with the program.

5. A method according to claim 1, further comprising a step of interrupting the flow of the program if the analysis reveals that the program being monitored has not been run as expected.

6. A method according to claim 1, further comprising an invalidation step for future use of the device comprising the monitored program if said analysis reveals a predetermined number of times that the program being monitored has not run in the expected manner.

7. A method according to claim 1 wherein the set of instructions to be monitored does not include jumps in its expected flow.

8. A method according to claim 1 wherein, when the program to be monitored provides for at least one jump, the monitoring method is applied separately to sets of instructions in the program which do not include jumps between two successive instructions.

9. A method according to claim 8, wherein, when the program to be monitored includes an instruction for a jump dependent on the manipulated data, the monitoring method is implemented separately for a set of instructions which precedes the jump, and for at least one set of instructions which follows said jump.

10. A method according to claim 9, wherein, for a set of instructions providing for a jump, an instruction which controls this jump is integrated in said set of instructions for the purpose of obtaining a verification value for this set of instructions before executing the jump instruction.

11. A method according to claim 1 wherein the analysis is reinitialised before each new monitoring of a sequence of instructions to be monitored.

12. A method according to claim 11, wherein the reinitialisation of the analysis of each new monitoring includes the step of erasing or replacing a verification value obtained during a previous analysis.

13. A method according to claim 11 wherein the reinitialisation of the monitoring analysis is controlled by the software itself.

14. A method according to claim 1 wherein the analysis produces a verification value obtained as the last value in a series of values which is made to change successively with the analysis of each of the analysed instructions of the set of instructions, thus making it possible to contain an internal state of the running of the monitoring method and to follow its changes.

15. A method according to claim 1 wherein the analysis includes the step of calculating, for each instruction under consideration following a previous instruction, the result of an operation on both a value obtained of the instruction in question and the result obtained by the same operation performed on the previous instruction.

16. A method according to claim 1 wherein the analysis includes the step of recursively applying a hash function to values obtained of each monitored instruction, starting from a last initialisation performed.

17. A method according to claim 1 wherein the analysis includes the step of making a verification value change by performing a redundancy calculation on all the operating codes and the addresses executed since the last initialisation was carried out.

18. A method according to claim 1 wherein the analysis includes the step of obtaining a comparison value by calculating successive intermediate values as the data of the respective instructions are obtained.

19. A method according to claim 1 wherein the analysis comprises a step of saving each data item necessary for verification, obtained from instructions in the set of instructions to be monitored as they are executed, and performing a calculation of a verification value from these data only at the necessary time, once all the necessary data have been obtained.

20. A device for monitoring progress with the execution of a series of instructions of a computer program stored in a computer-readable memory, comprising means for analysing the sequence of instructions transmitted from said memory to the processor intended to execute the program being monitored by extracting a data item from each instruction transmitted to the processor and performing a calculation on said data item, and means for verifying the result of this analysis by comparing the result of said calculation to reference data recorded with said program, wherein the reference data comprises a value pre-established so as to correspond to the result of the analysis produced during monitoring only if all the instructions in the sequence of instructions have actually been analysed during the running of the program.

21. A device according to claim 20, further including a register for recording intermediate results in a calculation in a chain carried out by the analysis means in order to obtain a verification value.

22. A device according to claim 21, further comprising means for recording a predetermined value or resetting the register under the control of an instruction transmitted during the execution of a program to be monitored.

23. A device according to claim 20, further comprising means for counting the number of unexpected events in the program being monitored, as determined by the analysis means, and means for invalidating the future use of the program to be monitored if this number reaches a predetermined threshold.

24. A device according to claim 20 that is integrated into a programmed device containing said program to be monitored.

25. A device according to claim 20 that is integrated into a program execution device.

26. A program execution device that executes a series of instructions of a computer program stored in a computer-readable memory, comprising means for analysing the sequence of instructions retrieved from said memory for execution by extracting a data item from each instruction and performing a calculation on said data item, and means for verifying the result of this analysis by comparing the result of said calculation to reference data recorded with the program to be monitored, wherein the reference data comprises a value pre-established so as to correspond to the result of the analysis produced during monitoring only if all the instructions in the sequence of instructions have actually been analysed during the running of the program.

27. A programmed device containing a computer-readable memory storing a program having a series of recorded instructions and a also storing reference data pre-established as a function of data contained in said instructions for analysis and verification of the sequence of instructions, wherein the reference data comprises a value pre-established so as to correspond to the result of the analysis produced during monitoring only if all the instructions in the sequence of instructions have actually been analyzed during the execution of the program by said device.

28. A device according to claim 27, wherein said device is a smart card.

29. A device according to claim 27 wherein the reference data are recorded in the form of a prewired value or values fixed in memory.

30. A device for programming a programmed device according to claim 27, comprising means for entering, in at least one predetermined location in a sequence of instructions in the program, a reference value calculated according to a pre-established mode from data included in each instruction in a set of instructions whose execution is to be monitored.

31. A method for verifying proper execution of a sequence of instructions in a program stored in a computer-readable memory, comprising the following steps:
  (i) retrieving an instruction in said sequence from said memory, for execution by the processor;
  (ii) calculating an updated monitoring value by processing data contained in the retrieved instruction with a stored monitoring value, and replacing the stored monitoring value with the updated monitoring value;
  (iii) loading the retrieved instruction into the processor for execution;
  (iv) repeating steps (i)–(iii) for each instruction in the sequence;
  (v) retrieving from said memory a monitoring instruction at the end of the said sequence of instructions that contains a reference value;
  (vi) comparing said reference value to the stored monitoring value; and
  (viii) confirming whether the proper set of instructions in said sequence have been executed, on the basis of said comparison.

32. The method of claim 31, wherein the data contained in the retrieved instruction comprises the numerical value of binary code for the instruction.

33. The method of claim 32, wherein the processing of said data comprises a hashing operation performed on said numerical value with the stored monitoring value.

34. The method of claim 31 further including the step of retrieving an initial monitoring instruction at the beginning of said sequence that contains an initial monitoring value, and storing said initial monitoring value as the stored monitoring value.

35. The method of claim 31, further including the step of interrupting the execution of said program if said comparison indicates that the proper set of instructions has not been executed.

36. The method of claim 31 wherein, if said program contains a jump instruction, steps (v)–(vii) are executed prior to said jump instruction.

* * * * *